United States Patent [19]

Shimizu et al.

[11] Patent Number: 5,414,061
[45] Date of Patent: May 9, 1995

[54] POLYMER SCALE PREVENTIVE LIQUID AND METHOD OF PREVENTING POLYMER SCALE DEPOSITION

[75] Inventors: Toshihide Shimizu, Urayasu; Takanori Sato, Naka, both of Japan

[73] Assignee: Shin-Etsu Chemical Co., Ltd., Tokyo, Japan

[21] Appl. No.: 206,262

[22] Filed: Mar. 7, 1994

Related U.S. Application Data

[62] Division of Ser. No. 716,995, Jun. 18, 1991, abandoned.

[30] Foreign Application Priority Data

Jun. 19, 1990 [JP] Japan ................. 2-160293

[51] Int. Cl.⁶ .................................................. C08F 2/00
[52] U.S. Cl. ............................................. 526/62; 526/74
[58] Field of Search ...................................... 526/62, 74

[56] References Cited

U.S. PATENT DOCUMENTS

| | | |
|---|---|---|
| 2,880,104 | 3/1959 | Scholl . |
| 4,258,157 | 3/1981 | Hong ..................... 526/62 |
| 4,622,245 | 11/1986 | Shimizu . |
| 4,657,820 | 4/1987 | Halpern . |

FOREIGN PATENT DOCUMENTS

| | | |
|---|---|---|
| 0372996 | 6/1990 | European Pat. Off. . |
| 0387637 | 9/1990 | European Pat. Off. . |
| 2522473 | 11/1975 | Germany . |

OTHER PUBLICATIONS

Label from "Campbells's Tomato Soup", Campbell Soup Co., Camden, N.J.
"Lactic acid fermentation products of sunflower seed milk", Fujisawa et al., S. African, Jul. 25, 1984, 15 pp.
"Aqueous, stable solutions of organic acid mixtures", Bisle, H. E., German 2700568, Mar. 9, 1978, 4 pp.
"Mononuclear oil-containing microcapsules", Ross et al., German 2427470, Jan. 9, 1975, 16 pp.
"Proteins and anionic polysaccharides as stabilizers of oil/water emulsions", Tolstogazov et al., J. Dispersion Sci. Technol. 6(5), 575-603.
Database WPIL, No. 90-129807, Derwent Publications Ltd, London, GB; & JP-A-2 080 403 (Shin-Etsu) *Abstract*.

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A polymer scale preventive liquid for use in polymerization of a monomer having an ethylenic double bond, comprising (A) a protein and (B) an anionic polysaccharide, and having a pH 7 or less; and a method of preventing polymer scale deposition in a polymerization vessel, which comprises carrying out the polymerization of said monomer in a polymerization vessel having a coating on its inner wall surfaces by applying said liquid and then drying. Deposition of polymer scale can be effectively prevented; in addition, polymers with a high whiteness can be prepared. Moreover, this polymer scale preventive liquid has no poisonousness and is highly safe.

8 Claims, No Drawings

… …

POLYMER SCALE PREVENTIVE LIQUID AND METHOD OF PREVENTING POLYMER SCALE DEPOSITION

This application is a Division of application Ser. No. 07/716,995, filed on Jun. 18, 1991, now abandoned.

BACKGROUND OF THE INVENTION

1. Field of the Invention

The present invention relates to a polymer scale preventive liquid in polymerization of a monomer having an ethylenic double bond, and a method of preventing polymer scale deposition.

2. Description of the Prior Art

In processes of preparing polymers by polymerizing a monomer in a polymerization vessel, the problem that polymer deposits on the inner wall surface and so forth in the form of scale, is known. The deposition of the polymer scale on the inner wall results in disadvantages that the yield of the polymer and cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer and operators may be exposed thereto, which may cause physical disorders in the operators.

Heretofore, as methods for preventing polymer scale deposition on the inner wall surface and so forth of a polymerization vessel in polymerization of a monomer having an ethylenic double bond, methods in which substances exemplified below are coated on the inner wall surface, etc. as a scale preventive agent, have been known.

For example, particular polar organic compounds (Japanese Patent Publication (KOKOKU) No. 45-30343(1970)), a dye or pigment (Japanese Patent Publication (KOKOKU) Nos. 45-30835(1970) and 52-24953(1977)), an aromatic amine compound (Japanese Pre-examination Patent Publication (KOKAI) No. 51-50887(1976)) and a reaction product of a phenolic compound and an aromatic aldehyde (Japanese Pre-examination Patent Publication (KOKAI) No. 55-54317(1980)) are disclosed.

In the meantime, vinyl chloride polymers obtained by polymerization are required to have a good whiteness; for example, they are required to have an L value according to the Hunter's color difference equation, which is described in JIS Z 8730 (1980), of 70 or more.

The prior art polymer scale preventive agents generally include a great number of colored substances as exemplified typically by the dyes and pigments described in Japanese Patent Publication (KOKOKU) Nos. 45-30835(1970) and 52-24953(1977), the aromatic amine compounds described in Japanese Pre-examination Patent Publication (KOKAI) No. 51-50887(1976), and the reaction products of a phenolic compound and an aromatic aldehyde described in Japanese Pre-examination Patent Publication (KOKAI) No. 55-54317(1980). Presumably, therefore, a colored polymer is obtained in polymerization such as suspension polymerization and the like of vinyl chloride, etc. in a polymerization vessel, which has a coating comprising the polymer scale preventive agent described above formed on its inner wall. That is, according to measurement of the lightness L described above, the L may be measured to be 65 or less, and coloration is thereby confirmed. Presumably, the coloration is caused by incorporation of components of the coating which has dissolved or peeled into the polymerization system. Improvement is required also for producing a polymer of high quality.

Moreover, the prior art polymer scale preventive agents generally include poisonous substances as exemplified typically by terrible substances such as aniline, nitrobenzene, formaldehyde, etc. among the polar compounds described in the above-mentioned Japanese Patent Publication (KOKOKU) No. 45-30343(1970), and pigments containing a heavy metal such as chromium or lead among the pigments described in Japanese Patent Publication (KOKOKU) No. 45-30835(1970). The dyes described in Japanese Patent Publication (KOKOKU) Nos. 45-30835(1970) and 52-24953(1977) include some dyes that involve concern about carcinogenesis. Therefore, use of these substances may cause problems in safety of operators.

SUMMARY OF THE INVENTION

An object of the present invention is to provide a polymer scale preventive liquid which are capable of preventing polymer scale deposition effectively, puts no color to product polymers to thereby produce the polymers with high whiteness, and are not poisonous and therefore causes no concern with respect to safety or sanitation, and a method of preventing polymer scale deposition using the same.

Thus, the present invention provides, as a means of solving said problems, a polymer scale preventive liquid for use in polymerization of a monomer having an ethylenic double bond, comprising:
(A) a protein and
(B) an anionic polysaccharide, and having a pH 7 or less.

The present invention also provides a method of preventing polymer scale deposition in polymerization of a monomer having an ethylenic double bond in a polymerization vessel, which comprises carrying out said polymerization in a polymerization vessel having a coating on its inner wall surfaces formed by applying a liquid comprising:
(A) a protein and
(B) an anionic polysaccharide, followed by drying.

According to the present invention, deposition of polymer scale can be effectively prevented; in addition, high whiteness polymers with an L value of 70 or more can be prepared. Moreover, the scale preventive liquid of the present invention has no poisonousness or the like and is highly safe; hence there is no problem about safety or sanitation of operators.

The polymer scale preventive liquid of the present invention contains the Component (A) and the Component (B), in addition, has a pH of 7 or less. Therefore, when the above-mentioned liquid is applied on the inner wall surface, etc. of a polymerization vessel, the polymer scale preventing effect thereof is extremely high.

Further, according to the present invention, polymer scale deposition can be effectively prevented, irrespectively of polymerization conditions such as the kinds of a monomer or a polymerization initiator, polymerization form, the kind of the material constituting the inner wall of polymerization vessels, etc. That is, deposition of polymer scale can be effectively prevented, for example, on polymerization in which polymer scale deposition has been difficult to prevent, in the case a polymerization vessel made of stainless steel in which polymer scale has been liable to deposit is used, or in the case a polymerization initiator with a strong oxidizing action such as potassium peroxodisulfate and the like is used.

DETAILED DESCRIPTION OF PREFERRED EMBODIMENTS

(A) Protein

The Component (A) a protein in the polymer scale preventive liquid of the present invention has no poisonousness or the like; hence the protein is suitable for the object of the present invention.

The (A) protein includes, for example, simple proteins, conjugated proteins, derived proteins and alkali metallic salts thereof such as sodium salts and potassium salts, and ammonium salts thereof.

The simple protein includes, for example, albumins such as egg albumin, milk albumin, globin, leucosin, etc.; globulins such as serum globulin, fibrinogen, glycinin etc.; glutelins such as oryzenin, glutenin, hordenine, etc.; prolamins such as gliadin, zein, hordein, etc.; screloproteins such as collagen, elastin, keratin, fibroin, etc.; histones such as thymus histone, etc.; and protamines such as salmine, clupeine, etc.

The conjugated protein includes, for example, nucleoproteins composed of a nucleic acid and a simple protein such as nucleohistone, nucleoprotamine, etc.; glycoproteins composed of a carbohydrate and a simple protein such as mucin, mucoid, etc.; phosphoproteins composed of a substance containing phosphorus and a simple protein such as caseins, ovovitellin, etc.; and lipoproteins composed of a lipid and a simple protein such as lecithoprotein, histofibrinogen, etc. Glutens comprising a glutelin protein and a prolamin protein may be used.

The derived protein includes, for example, gelatin and glue.

Among the proteins described above, preferred are sodium caseinate, gelatin, egg albumin, gluten, collagen, and zein.

These (A) proteins can be used singly or in combination of two or more.

(B) Anionic polysaccharide

The Component (B) an anionic polysaccharide in the polymer scale preventive liquid of the present invention has no poisonousness as said component (A) dose not either; hence the anionic polysaccharide is suitable for the object of the present invention.

The anionic polysaccharide (B) of this type includes, for example, anionic plant mucous polysaccharides such as pectin, pectic acid, pectinic acid, alginic acid, fucoidin, carragheenin, etc.; anionic animal mucous polysaccharides such as hyaluronic acid, chondroitin sulfuric acid, heparin, kerato sulfuric acid, charonin sulfuric acid, limacoitin sulfuric acid, etc.; starches having a carboxyl group such as carboxymethyl starch, etc.; anionic cellulose derivatives such as cellulose xanthogenic acid, etc.; and alkali metallic salts thereof, such as sodium salts, potassium salts, etc., or ammonium salts thereof.

Among the polysaccharides described above, preferred are pectin, sodium alginate, carragheenin, sodium chondroitin sulfate, and a sodium salt of carboxymethyl cellulose.

These (B) anionic polysaccharides can be used singly or in combination of two or more.

Preparation of a Polymer Scale Preventive Liquid

The polymer scale preventive liquid of the present invention is prepared by adding said Component (A) and said Component (B) into a suitable solvent.

The liquid described above comprises a solution wherein both of the Component (A) and the Component (B) are dissolved as solutes in a solvent, and a liquid wherein both or one of the Component (A) and the Component (B) are/is dispersed in the form of colloid.

The solvent used for preparation of the liquid includes, for example, water; alcohols such as methanol, ethanol, propanol, butanol, 2-butanol, 2-methyl-1-propanol, 2-methyl-2-propanol, 3-methyl-1-butanol, 2-methyl-2-butanol, 2-pentanol, etc.; ketones such as acetone, methyl ethyl ketone, methyl isobutyl ketone, etc.; esters such as methyl formate, ethyl formate, methyl acetate, methyl acetoacetate, etc.; ethers such as 4-methyldioxolane, ethylene glycol diethyl ether, etc.; furans; and aprotic solvents such as dimethylformamide, dimethyl sulfoxide, acetonitrile, etc. These solvents are appropriately used singly or as a mixed solvent of two or more.

The total concentration of the Component (A) and the Component (B) is not particularly limited as long as the preferred coating amount described later is attained, but normally it may be in the range of from 0.005 to 10% by weight, preferably from about 0.01 to 5% by weight. And the Component (B) is contained normally in an amount of 0.1 to 1,000 parts by weight, preferably 1 to 600 parts by weight, per 100 parts by weight of the Component (A) in said liquid. If the Component (B) is used in too small an amount or in too large an amount relatively to the Component (A), the polymer preventing effect by virtue of the combined use may not be obtained.

It is necessary for the liquid thus prepared to have a pH of 7 or less, preferably a pH of 5 or less. If the liquid has a pH of more than 7, when the liquid is applied as a coating liquid, the polymer scale deposition cannot be sufficiently prevented. Therefore, in the case the pH value of the liquid is more than 7, or in the case the pH is less than 7 but a further small pH value is desired, a right pH adjuster may be added to attain the desired pH value as necessary. A pH adjuster which may be used includes, for example, phosphoric acid, phytic acid, hydrochloric acid, acetic acid, glycolic acid, and tartaric acid. An acid may be appropriately selected from these.

In the polymer scale preventive liquid of the present invention, both of said Component-(A) and said Component (B) which are effective to prevent polymer scale deposition, are added, moreover, a solvent, a cationic surfactant, a nonionic surfactant, an anionic surfactant, and so forth can be added if necessary.

The compound which can be added other than those described above includes, for example, silicic acids, silicates such as orthosilicic acid, metasilicic acid, mesosilicic acid, mesotrisilicic acid, mesotetrasilicic acid, sodium metasilicate, sodium orthosilicate and disilicate, sodium tetrasilicate, sodium metasilicate and water glass; metallic compounds such as oxygen acid salts, acetates, nitrates, hydroxides or halides of a metal selected from alkali earth metals such as magnesium, calcium, and barium, zinc family elements such as zinc, aluminum family elements such as aluminum, tin family elements such as titanium and tin, and platinum family elements such as platinum; and colloids such as gold colloid, silver colloid, ferric hydroxide colloid, colloid of stannic acid, colloid of silicic acid, colloid of barium sulfate, and colloid of aluminum hydroxide. The above-mentioned colloids include inorganic colloids prepared, for example, by mechanical crushing, irradiation with ultrasonic wave, electrical dispersion or chemical methods.

Formation of Coating

The liquid described above is used as a coating liquid for forming a coating on the inner wall surface or the like of polymerization vessel by applying the liquid thus prepared.

For example, first, said liquid (hereinafter referred to as coating liquid) is applied to the inner wall surface of a polymerization vessel and then dried sufficiently, for example, at a temperature within the range from room temperature to 100° C., followed by washing with water if necessary, to form a coating on the inner wall surface of a polymerization vessel. In this way, a coating is formed on the inner wall surface of a polymerization vessel; hence the polymer scale deposition thereon can be prevented.

The method of applying the coating liquid is not particularly limited, and includes, for example, the brush coating, spray coating, the method of filing the polymerization vessel with the coating liquid followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The coating liquid is preferably applied to not only the inner wall surfaces of a polymerization vessel but also other parts with which the monomer comes into contact during polymerization, thereby forming a coating thereon. For example, it is preferred to form on a stirring shaft, stirring blades, condensers, headers, search coil, bolts, nuts, etc. Particularly, a coating on a stirring shaft, stirring blades and baffles should, normally, be formed. The application of the coating liquid may be carried out in the same way as in the formation of the coating on the inner wall surfaces.

More preferably, for formation of a coating, the coating liquid is applied to not only the parts with which the monomer comes into contact during polymerization but also other parts on which polymer scale may deposit, for example, such as the inner surfaces of equipment and tubes of recovery system for unreacted monomer. These parts, more specifically, are exemplified by the inner wall surfaces of monomer distillation columns, condensers, monomer stock tanks and valves, etc. Formation of the coating may be also carried out in the same way as in the formation of the coating on the inner wall of polymerization vessel.

The method of drying wet coated surface provided by application of the coating liquid, is not limited, either. Following methods can be used, for instance. That is, a method in which, after the liquid is applied, hot air with a suitable elevated temperature is blown to the coated surface, and a method in which the inner wall surface of a polymerization vessel and the surfaces of other parts to be coated are previously heated to from 30° to 80° C. and the coating liquid is directly applied to the heated surfaces, etc. After dried, the coated surfaces are washed with water if necessary.

The coating formed as described above makes it possible to prevent deposition of polymer scale on all the coated parts.

The coating thus formed has normally a coating weight, i.e., the total weight of the Component (A) and the Component (B) per unit area, of 0.001 $g/m^2$ or more, preferably from 0.05 to 2 $g/m^2$.

The above coating operation may be conducted every 1 to ten-odd batches of polymerization. The formed coating has fairly good durability and retains the polymer scale-preventing action; therefore the coating operation is not necessarily performed for every batch of polymerization. Hence, the productivity of the manufactured polymer is improved.

The polymer scale preventive liquid of the present invention may be added into a polymerization medium. In this case, for example, said liquid is used for coating operation, and in addition a small amount of a liquid like the above is added into the polymerization medium directly. By this addition, the effect of preventing polymer scale deposition is further enhanced as compared with the coating operation only. In the case of adding the polymerization preventive liquid into the polymerization medium, an amount of the liquid to be added preferably ranges from about 10 ppm to 1,000 ppm based on the whole weight of the charged monomer having an ethylenic double bond.

Polymerization

After the formation of the coating on the inner wall surfaces of a polymerization vessel and other parts with which monomer may come into contact, polymerization is carried out in accordance with conventional procedures therein. That is, a monomer having an ethylenic double bond and a polymerization initiator (catalyst) are charged, and then, a polymerization medium such as water, etc. and, optionally, a dispersing agent such as suspension agents, solid dispersing agents, and nonionic and anionic emulsifying agents, etc. are charged, followed by carrying out polymerization according to conventional methods.

The monomer having an ethylenic double bond to which the method of this invention can be applied includes, for example, vinyl halides such as vinyl chloride; vinyl esters such as vinyl acetate and vinyl propionate; acrylic acid, methacrylic acid, and esters and salts thereof; maleic acid, fumaric acid, and esters and anhydrides thereof; and diene monomers such as butadiene, chloroprene and isoprene; aromatic vinyl compounds such as styrene; as well as acrylonitrile, halogenated vinylidenes, and vinyl ethers.

There are no particular limitations on the type of polymerization to which the method of this invention can be applied. The present invention is effective in any types of polymerization such as suspension polymerization, emulsion polymerization, solution polymerization, bulk polymerization, and gas phase polymerization. Particularly, the present method is suitable to polymerizations in an aqueous medium such as suspension or emulsion polymerization.

Specifically, in the case of suspension polymerization and emulsion polymerization, polymerization is generally performed as follows, for instance.

First, water and a dispersing agent are charged into a polymerization vessel, and thereafter a polymerization initiator is charged. Subsequently, the inside of the polymerization vessel is evacuated to a pressure of from about 0.1 to about 760 mmHg, and a monomer is then charged (whereupon the pressure inside the polymerization vessel usually becomes from 0.5 to 30 kgf/cm$^2$.G). Then, the polymerization is normally carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization may be carried out at 30° to 80° C.; in the case of polymerizing styrene, polymerization may be carried out at 50° to 150° C. The polymerization may be judged to be completed when the pressure inside the polymerization vessel falls to from about 0 to 7 kgf/cm$^2$.G or when cooling water which passes through a jacket provided around the polymerization vessel indicates almost the same temperature at the inlet where it is charged and at the outlet where it is discharged (i.e., when liberation of heat due to polymerization reaction has been completed). The water, dispersing agent and polymerization initiator charged for the polymerization are used in amounts of about 100 to 500 parts by weight, about 0.01 to 30 parts by weight, and about 0.01 to 5 parts by weight, respectively, per 100 parts by weight of the monomer.

In the case of solution polymerization, an organic solution such as toluene, xylene, pyridine and the like is used as a polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged, and then polymerization is carried out at a temperature of from −10° C. to 250° C. Specifically, the bulk polymerization includes, for example, a liquid bulk polymerization and a gas phase polymerization for polymerizing vinyl chloride monomer.

The method of the present invention is effective in preventing polymer scale from depositing, independent of materials constituting the inner wall, etc. of a polymerization vessel. For example, this method is effective in preventing polymer scale from depositing in polymerization vessels made of a stainless steel or other steels or vessels lined with glass.

Any additive materials that have been added in a polymerization system can be used without any limitation. More specifically, the method of this invention can effectively prevent polymer scale from depositing, even in polymerization systems containing the following additives: for example, polymerization initiators such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethylhexyl) peroxydicarbonate, benzoyl peroxide, lauroyl peroxide, 2,4-dichlorobenzoyl peroxide, diisopropyl peroxydicarbonate, α,α'-azobis-2,4-dimethylvaleronitrile, potassium peroxodisulfate, ammonium peroxodisulfate, p-methane hydroperoxide; suspension agents comprised of natural or synthetic polymeric compounds such as partially saponified polyvinyl alcohols, polyacrylic acids, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calciumstearate, dibutyltin dilaurate and dioctyltin mercaptide; lubricants such as rice wax, stearic acid and cetyl alcohol; plasticizers such as DOP and DBP; chain transfer agents such as trichloroethylene and mercaptans as exemplified by t-dodecyl mercaptans; and pH adjusters.

EXAMPLE

The present invention is now described in detail by way of working examples and comparative examples. In each of the tables below, Experiment Nos. marked with * indicate comparative examples, and the other Experiment Nos., working examples of the present invention.

Example 1

Polymerization was carried out in the following manner using a polymerization vessel with an inner capacity of 1,000 liters and having a stirrer.

In each experiment, first, the Component (A) and the Component (B) were dissolved in a solvent so that the concentration thereof might become the value given in Table 1, to prepare a coating liquid. The coating liquid was applied to the inner wall and other parts with which a monomer comes into contact including the stirring shaft and stirring blades, followed by drying under heating at 60° C. for 15 min. to form a coating, which was then washed with water.

Experiments of Nos. from 101 to 103 are comparative examples in which no coating liquid was applied, or the coating liquid containing either the Component (A) or the Component (B) was applied. Experiment No. 108 is a comparative example in which the coating liquid had a pH of more than 7, and Experiment No. 115 is a comparative example in which a methanol solution containing Sudan B/Nigrosine/Na$_2$SiO$_3$ (weight ratio: 100/100/100)(which is the same as used in experiment No. 33 described in Japanese Patent Publication (KOKOKU) No. 52-24953(1977)) was used as a coating liquid.

The (A) protein and the (B) anionic polysaccharide, the total concentration thereof and the weight ratio of (A)/(B), the solvent and the pH adjuster in the coating liquid used in each experiment are given in Table 1.

Subsequently, in the polymerization vessel in which a coating had been formed by the coating operation as above, were charged 400 kg of water (polymerization medium), 200 kg of vinyl chloride (monomer), 250 g of partially saponified polyvinyl alcohol (suspension agent), 25 g of hydroxypropylmethyl cellulose (suspension agent) and 75 g of bis(2-ethylhexyl) peroxydicarbonate (polymerization initiator). Then, polymerization was carried out at 57° C. with stirring for 6 hours. After the completion of the polymerization, the amount of polymer scale depositing on the inner wall of the polymerization vessel was measured. Further, the whiteness degree of the polymer obtained in each Experiment was measured according to the following method.

A hundred parts by weight of a polymer, one part by weight of a stabilizing agent TS-101 (product of Akishima Chemical Co.) and 0.5 part by weight of a stabilizing agent C-100J (product of Katsuta Kako Co.), and 50 parts by weight of a plasticizer DOP were kneaded at 160° C. for 5 min. with a twin roll mill, and then formed into a sheet 1 mm thick. Subsequently, this sheet was placed in a mold measuring 4 cm×4 cm×1.5 cm (thickness), and molded under heating at 160° C. and under the pressure of 65 to 70 kgf/cm² to prepare a test specimen. This test specimen was measured for lightness L in the hunter's color difference equation described in JIS Z 8730 (1980). Whiteness was evaluated to become higher with increase in L value.

The L value was determined as follows.

(1) The stimulus value Y of XYZ color system was determined according to the photoelectric tristimulus colorimetry using the standard light C, a photoelectric colorimeter (Color measuring color difference meter Model Z-1001DP, product of Nippon Denshoku Kogyo K.K.) in accordance with JIS Z 8722. As the geometric condition for illumination and receiving of light, the condition d defined in section 4.3.1 of JIS Z 8722 was adopted.

(2) Next, L was calculated based on the equation: L=10Y^½ described in JIS Z 8730(1980).

The results are given in Table 1.

vessel having an inner capacity of 20 liters and equipped with a stirrer, except that a coating liquid in which the (A) protein and the (B) anionic polysaccharide, the total concentration thereof and the weight ratio of (A)/(B), the solvent, the pH adjuster and the pH of the coating liquid are as given in Table 2, was used. Experiments of Nos. from 201 to 203 are comparative experiments in which no coating liquid was applied, or the coating liquid containing either a Component (A) or a Component (B) was applied. Experiment No. 205 is a comparative experiment in which the coating liquid had a pH of more than 7.

In the polymerization vessel for which the coating was thus formed, were charged 9 kg of water (polymerization medium), 225 g of sodium dodecylbenzenesulfonate (anionic emulsifying agent), 12 g of t-dodecyl mercaptan (chain transfer agent), and 13 g of potassium peroxodisulfate (polymerization initiator). After the inner atmosphere was replaced with a nitrogen gas, 1.3 kg of styrene (monomer) and 3.8 kg of butadiene (monomer) were charged, followed by polymerization at 50° C. for 20 hours.

After completion of the polymerization, the amount of polymer scale depositing on the inner wall surface of the polymerization vessel was measured. The results are given in Table 2.

TABLE 1

| Exp. No. | (A) Protein | (B) Anionic Polysaccharide | (A) + (B) Total concentration (wt. %) | Weight ratio (A)/(B) | Solvent (Weight ratio) | pH adjuster | pH | Amount of polymer scale (g/m²) | L value |
|---|---|---|---|---|---|---|---|---|---|
| 101* | — | — | — | — | — | — | — | 1300 | 73 |
| 102* | Sodium caseinate | — | 0.2 | 100/0 | Water/Methanol (90/10) | — | 7.5 | 1200 | 73 |
| 103* | — | Pectin | 0.2 | 0/100 | Water/Methanol (90/10) | — | 4.5 | 1100 | 73 |
| 104 | Sodium caseinate | Pectin | 0.2 | 50/50 | Water/Methanol (90/10) | Phosphoric acid | 5.0 | 1 | 72.5 |
| 105 | Sodium caseinate | Pectin | 0.2 | 20/80 | Water/Methanol (90/10) | Phosphoric acid | 5.0 | 0 | 72.5 |
| 106 | Sodium caseinate | Pectin | 0.2 | 80/20 | Water/Methanol (90/10) | Phosphoric acid | 5.0 | 0 | 73 |
| 107 | Sodium caseinate | Sodium pectinate | 0.2 | 50/50 | Water/Methanol (90/10) | Phosphoric acid | 3.5 | 0 | 73 |
| 108* | Sodium caseinate | Sodium pectinate | 0.2 | 50/50 | Water/Methanol (90/10) | — | 8.0 | 10 | 72 |
| 109 | Gelatin (CLV) | Sodium alginate | 0.05 | 10/90 | Water/Isobuthyl alcohol (90/10) | Phytic acid | 4.0 | 0 | 72.5 |
| 110 | Egg albumin | Carragheenin | 0.5 | 15/85 | Water/2-methyl-1-propernol (90/10) | Phydrochloric acid | 5.0 | 0 | 72 |
| 111 | Gelatin (AE) | Sodium pectinate | 0.1 | 10/90 | Water | Sulfuric acid | 4.0 | 0 | 73 |
| 112 | Gulten | Sodium chondroitin sulfate | 0.1 | 10/90 | Water | Acetic acid | 3.0 | 0 | 73 |
| 113 | Collagen (SCL) | Sodium salt of carboxymethyl-cellulose | 0.1 | 10/90 | Water | Glycollic acid | 3.5 | 0 | 72.5 |
| 114 | Zein | Pectin (made from lemon) | 0.5 | 20/80 | Water/Methanol (40/60) | Trataric acid | 2.5 | 0 | 73 |
| 115* | Coating liquid used in Exp. No. 33 described in Japanese Patent Publication (KOKOKU) No. 52-24953 (1977) | | | | | — | — | 10 | 65 |

Example 2

In each experiment, the coating procedure of Example 1 was repeated for a stainless steel polymerization

TABLE 2

| Exp. No. | (A) Protein | (B) Anionic Polysaccharide | (A) + (B) Total concentration (wt. %) | Weight ratio (A)/(B) | Solvent (Weight ratio) | pH adjuster | pH | Amount of polymer scale (g/m²) |
|---|---|---|---|---|---|---|---|---|
| 201* | — | — | — | — | — | — | — | 400 |

TABLE 2-continued

| Exp. No. | (A) Protein | (B) Anionic Polysaccharide | Coating liquid (A) + (B) Total concentration (wt. %) | Weight ratio (A)/(B) | Solvent (Weight ratio) | pH adjuster | pH | Amount of polymer scale (g/m$^2$) |
|---|---|---|---|---|---|---|---|---|
| 202* | Gelatin (AP-150) | — | 0.5 | 100/0 | Water | — | 5.5 | 380 |
| 203* | — | Pectin | 0.5 | 0/100 | Water | — | 4.2 | 390 |
| 204 | Gelatin (AP-150) | Pectin | 0.5 | 50/50 | Water | Diphosphoric acid | 4.2 | 1 |
| 205* | Sodium caseinate | Sodium alginate | 0.1 | 30/70 | Water/Methanol (90/10) | — | 8.5 | 11 |
| 206 | Sodium caseinate | Sodium alginate | 0.1 | 30/70 | Water/Methanol (90/10) | Phosphoric acid | 4.0 | 2 |
| 207 | Gluten | Sodium salt of carboxymethylcellulose | 0.2 | 20/80 | Water/2-methy-1-propanol (95/5) | Trataric acid | 4.5 | 3 |

The (A) proteins and (B) anionic polysaccharides given in Tables 1 and 2 are supplied by the manufacturers shown in Table 3 below.

TABLE 3

| Materials* | Supplier |
|---|---|
| Sodium caseinate | Wako Junyaku Kogyo K.K. |
| Egg albumin | Wako Junyaku Kogyo K.K. |
| Gluten | Wako Junyaku Kogyo K.K. |
| Zein | Wako Junyaku Kogyo K.K. |
| Pectin | Wako Junyaku Kogyo K.K. |
| Sodium salt of carboxymethylcellulose | Wako Junyaku Kogyo K.K. |
| Carragheenin | Wako Junyaku Kogyo K.K. |
| Sodium chondroitin sulfate | Wako Junyaku Kogyo K.K. |
| Gelatin (CLV) | Nitta Gelation K.K. |
| Gelatin (AE) | Nitta Gelation K.K. |
| Gelatin (AP-150) | Nitta Gelation K.K. |
| Collagen (SCL) | Nippi K.K. |

*Remarks: Tradenames are indicated in parenthesis.

We claim:

1. A method of preventing polymer scale deposition in polymerization of a monomer having an ethylenic double bond in a polymerization vessel, which comprises carrying out said polymerization in a polymerization vessel having a coating on its inner wall surfaces formed by applying a liquid comprising (A) a protein and (B) an anionic polysaccharide, followed by drying.

2. The method according to claim 1, wherein said coating has a coating weight of 0.001 g/m$^2$ or more.

3. The method according to claim 1, wherein said coating has been also previously formed on parts of the polymerization vessel with which the monomer comes into contact during polymerization other than inner wall surface.

4. The method according to claim 3, wherein said parts with which the monomer comes into contact comprise at least one member selected from the group consisting of a stirring shaft, stirring blades, baffles, headers, search coils and condensers.

5. The method according to claim 1, wherein said coating has been further previously formed on parts of the recovery system for unreacted monomer with which unreacted monomer comes into contact.

6. The method according to claim 1, wherein the monomer is at least one member selected from the group consisting of vinyl halides; vinyl esters; acrylic acid, methacrylic acid, and esters and salts thereof; maleic acid and fumaric acid, and esters and anhydrides thereof; diene monomers; aromatic vinyl compounds; acrylonitrile; halogenated vinylidenes; and vinyl ethers.

7. The method according to claim 1, wherein said polymerization is carried out as suspension polymerization, emulsion polymerization, solution polymerization, bulk polymerization, or gas phase polymerization.

8. The method according to claim 1, wherein said coating solution is added to the polymerization medium.

* * * * *